Feb. 23, 1932.　　W. H. BUNTING ET AL　　1,846,306
MOLDING APPARATUS
Filed Feb. 16, 1931　　2 Sheets-Sheet 1

INVENTORS
William H. Bunting
George F. Zager
Oliver J. Heath
BY
ATTORNEYS

Feb. 23, 1932.  W. H. BUNTING ET AL  1,846,306
MOLDING APPARATUS
Filed Feb. 16, 1931   2 Sheets-Sheet 2
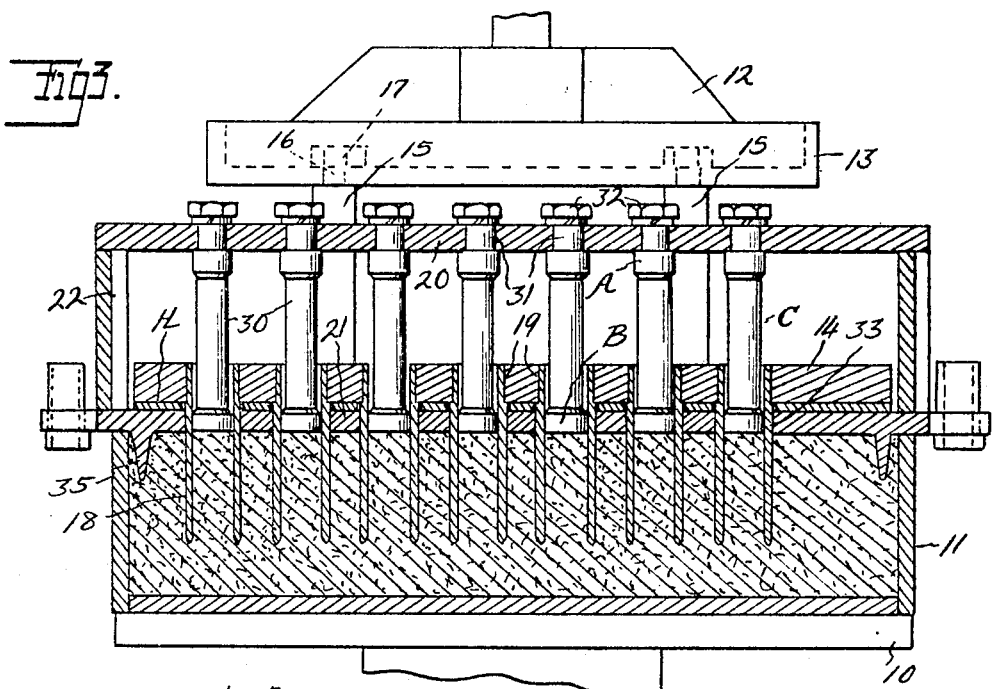
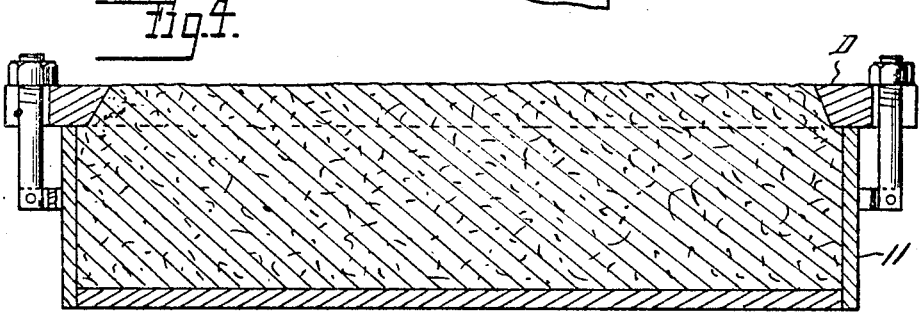
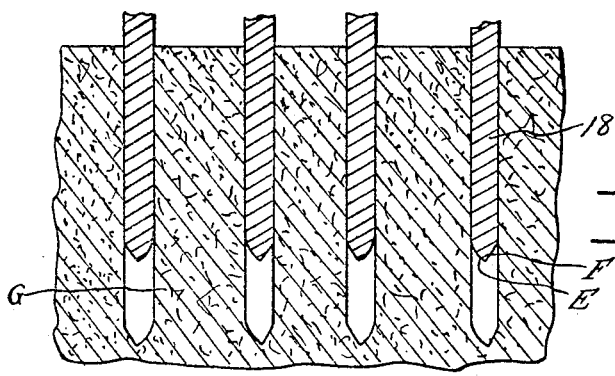
INVENTORS
William H. Bunting
George F. Yager
Oliver J. Heath
BY
ATTORNEYS Patented Feb. 23, 1932

1,846,306

UNITED STATES PATENT OFFICE

WILLIAM H. BUNTING, GEORGE F. YAGER, AND OLIVER J. HEATH, OF TOLEDO, OHIO, ASSIGNORS TO THE BUNTING BRASS AND BRONZE COMPANY, OF TOLEDO, OHIO, A CORPORATION OF OHIO

MOLDING APPARATUS

Application filed February 16, 1931. Serial No. 516,196.

This invention relates to apparatus for forming sand molds and has as one of its principal objects to simplify, render more efficient and improve generally apparatus of the above type by simplifying the construction of the several parts involved and by reducing the number of such parts to a minimum.

A further object of this invention is to provide apparatus capable of performing the molding operation with the minimum amount of handling of the mold and in such a manner as to expedite production and reduce the cost of manufacture.

With the foregoing as well as other objects in view, the invention resides in the particular construction of the molding apparatus which will be made more apparent as this description proceeds, especially when considered in connection with the accompanying drawings, wherein:

Figure 3 is a view similar to Figure 1 showing the parts of the molding apparatus in a different position;

Figure 4 is a side elevational view partly in section featuring the flask;

Figure 5 is an enlarged detailed sectional view illustrating the construction of the lower portion of the patterns.

Figure 1:
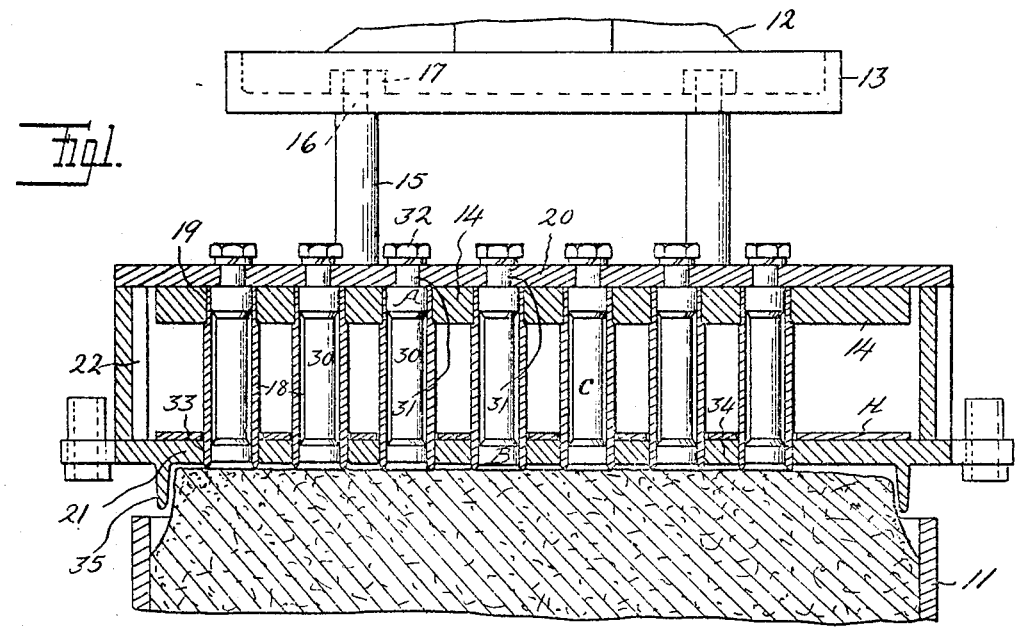
Figure 1 is a sectional view taken substantially on the line 1—1 of Figure 2.
Figure 2:
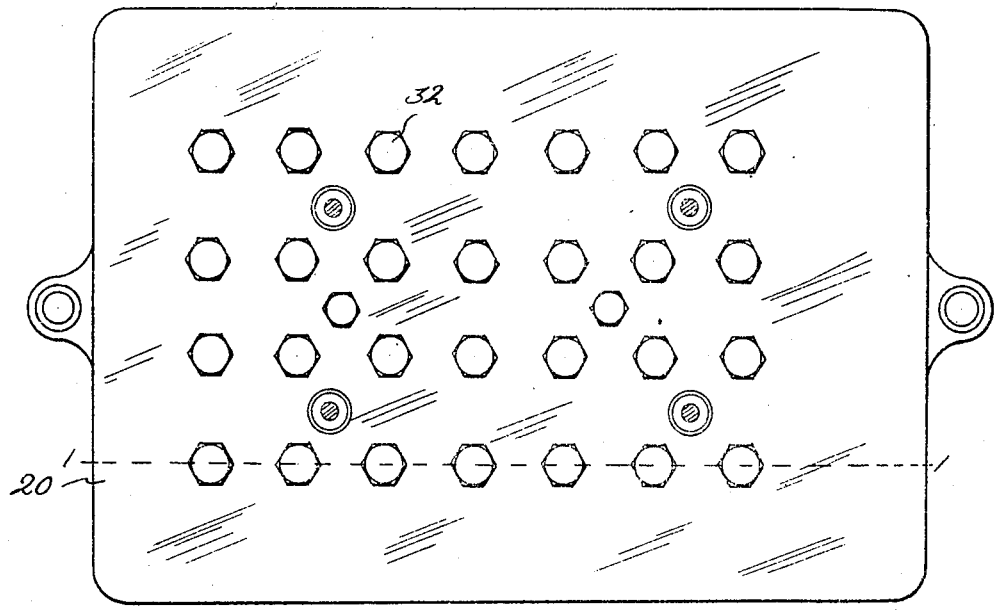
Figure 2 is a top view of a molding apparatus constructed in accordance with this invention.

As previously indicated, our improved molding apparatus is especially designed for forming sand molds and as shown in Figure 1 comprises a supporting plate 10 upon which a flask 11 of any suitable construction is adapted to rest. Positioned above the supporting plate 10 and mounted for reciprocation toward and from the latter is a ram 12 having a head 13 carrying a pattern plate 14 in spaced relation thereto. The connection between the head 13 and pattern plate 14 is accomplished by means of studs 15 having reduced upper end portions 16 adapted to project through the head and threaded for receiving suitable clamping nuts 17.

Permanently secured to the pattern plate 14 and projecting downwardly therefrom is a plurality of patterns 18 substantially tubular in shape in cross section and having reduced upper end portions 19 sleeved within suitable openings formed in the pattern plate 14. The openings are spaced predetermined distances from each other to provide for the proper spacing of the patterns 18 and the latter are secured within the openings by a soldering or welding operation.

Arranged above and below the pattern plate 14 is a pair of plates 20 and 21 disposed in planes substantially parallel to the plane of the pattern plate and respectively connected together adjacent the ends thereof by means of the side walls 22 coperating with the plates 20 and 21 to form a box-like construction. Carried by the plate 20 and extending downwardly therefrom are suitable studs 30 corresponding in number to the number of patterns 18 and arranged in axial alignment with the patterns 18 so as to telescope within the latter. In detail, as shown in Figure 1, the studs 30 are provided with reduced shank portions 31 at the upper ends thereof adapted to extend through suitable openings in the plate 20 and are clamped to the latter by clamping nuts 32 threaded upon the upper ends of the reduced portions. The portions A of the studs immediately below the reduced portions 31 and the lower end portions B thereof are preferably of such diameter as to slidably engage the inner walls of the tubular patterns while the portions C of the studs intermediate the portions A and B are of a reduced diameter so as to space the major portions of the studs from the walls of the patterns and thereby reduce friction to a minimum and compensate for any slight misalignment of the studs and patterns. It will be obvious from the foregoing that the studs serve to clean or strip the patterns as the latter are withdrawn from the mold.

The lower plate 21 is provided with a plurality of openings 33 arranged in axial alignment with the tubular patterns and are of a diameter to slidably receive the lower ends of the patterns 18. In this connection it is to be noted that the distance between the upper and lower plates 20 and 21 is such that when the pattern plate 14 is in its uppermost position as shown in Figure 1, the lower end portions of the patterns are sleeved within the openings in the plate 21 with the result that the latter, together with the pins 30, serve to rigidly support the patterns and maintain the free ends thereof in proper spaced relation. In addition to the above, it will be observed that the plate 21 also serves as an exterior stripper for the patterns as the latter are withdrawn from the mold.

Referring now to the operation of the molding apparatus described above and assuming that the parts of the latter are in the position illustrated in Figure 1, a flask containing sand or other molding material is placed upon the support 10 with the sand or molding material at the level indicated by the reference character 34. In this connection it is to be noted that the level 34 of the sand may be accurately determined by providing a form D adapted to seat upon the flask as shown in Figure 4 to form an extension therefor. The flask with the form thereon is filled with sand or other molding material and the latter is struck off flush with the top of the form whereupon the latter is removed leaving a portion of sand above the top of the flask. Thus, it will be obvious that the height of the form determines the level of the sand and as a consequence, controls the amount the mold is compressed. After the flask has been properly positioned and filled as above stated, the ram 12 is lowered causing the pattern plate 14 and associated patterns to move downwardly relative to the upper and lower plates 20 and 21, respectively. Downward movement of the patterns 18 causes the latter to project into the molding material supported by the flask and form the desired impression in the material. The patterns 18 continue to move downwardly relative to the upper and lower plates and studs 30 until the pattern plate 14 engages the lower stripper plate 21 at which time continued downward movement of the pattern plate by the ram causes the plates 20 and 21 to move downwardly as a unit with the patterns. Movement of the plate 21 downwardly from the position illustrated in Figure 1 compresses the sand within the flask around the tubular patterns 18 and since the studs 30 also move downwardly within the tubular patterns 18, it will be observed that these studs will compress the molding material within the tubular patterns against the inner side walls of the latter. In this connection it is to be noted that the plate 21 is provided with a depending continuous flange 35 defining an area slightly less than the area defined by the flask 11 with the result that this flange prevents the molding material above the top of the flask from escaping upon being compressed by the plate 21. In order to facilitate insertion and withdrawing of the patterns from the molding material, a suitable vibrator (not shown) may be clamped to the pattern plate for vibrating the patterns carried thereby during movement of the latter into or out of the molding material. Attention may be directed at this point to the construction of the lower ends of the tubular patterns which as shown in Figure 5 curve outwardly on a radius as at E and the outer circumferential edges thereof are chamfered as at F to form an angular surface adapted to meet the curved surface E. As will be obvious from Figure 5, the curved portions strengthen the core G while the angular surface cooperates with the curved surface to facilitate insertion of the patterns in the sand.

Assuming now that the parts of the apparatus are in the position illustrated in Figure 3 and it is desired to withdraw the patterns from the mold, it will be noted that upon upward movement of the ram, the pattern plate 14 and associated patterns are moved upwardly relative to the plate 21 and studs 30 until the pattern plate engages the lower surface of the upper plate 20 whereupon the entire unit is moved upwardly a sufficient distance to clear the flask. It will be seen that as the patterns 18 are moved upwardly relative to the studs 30 and plate 21, the latter members will serve to strip the interior and exterior surfaces of the patterns. From the foregoing it will be seen that the plate 21 not only serves to support and strip the patterns 18, but also functions as a pressure plate for compressing the sand within the flask. It will further be apparent from the preceding description that the length of the articles formed by the patterns may be varied by controlling the extent of movement of the patterns in the molding material. The foregoing may be accomplished in numerous ways, such for example as by interposing spacers of the desired dimension between the plates 14 and 21 for engaging the plate 20 when the patterns have been extended into the molding material the desired distance to arrest further movement of the pattern plate. One form of spacer which may be employed for accomplishing the above result is shown in Figure 1 at H.

While in describing the present invention the patterns have been referred to as being tubular in cross section, it is to be noted that the same may be of different configurations without departing from the spirit and scope of this invention and reservation is made to make such changes as may come within the purview of the accompanying claims.

What we claim as our invention is:

1. A molding apparatus having in combination, a member for supporting molding material, a pattern supporting member having a pattern projecting therefrom, means for moving the pattern supporting member relative to the member aforesaid to project the pattern into the molding material, and means subsequently operable by the pattern supporting member to compress the molding material around the pattern.

2. A molding apparatus having in combination, a reciprocable pattern plate having a pattern projecting therefrom operable upon movement of the plate in one direction to project into a molding material, and a pressure plate in the path of and operable by the pattern plate to compress the molding material around the pattern after a substantial portion of the pattern is inserted within the molding material.

3. A molding apparatus having in combination, a reciprocable pattern plate having a pattern projecting therefrom operable upon movement of the plate in one direction to project into a molding material, and a pressure plate normally spaced from the pattern plate but actuable thereby to compress the molding material around the pattern.

4. A molding apparatus having in combination, a member for supporting molding material, a second member having a pattern projecting therefrom, means for effecting relative movement of the members to project the pattern into the molding material, and a combined pressure and stripper plate actuated by one of said members after a substantial portion of the pattern is inserted within the molding material to compress the latter around said pattern.

5. A molding apparatus having in combination, a member for supporting molding material, a second member having a pattern projecting therefrom, means for effecting relative movement of the members to project the pattern into the molding material, and a stripper plate slidably engaging the exterior surface of the pattern and operable upon insertion of the pattern into the molding material to compress the latter around the pattern.

6. A molding apparatus having in combination, a reciprocable pattern plate having a pattern projecting therefrom operable upon movement of the plate in one direction to project into a molding material, and a combined stripper and pressure plate mounted for movement relative to the pattern plate in the path of movement of the latter and actuated by the pattern plate during the final portion of movement of the latter in the aforesaid direction to compress the molding material around the pattern.

7. A molding apparatus having in combination, a reciprocable pattern plate having a pattern projecting therefrom operable upon movement of the plate in one direction to project into a molding material, and means mounted for movement relative to the pattern plate in the path of travel of the latter normally engaging the free end portions of the pattern to support the same, said means including a plate actuated by the pattern plate during the final portion of movement of the latter toward the molding material to compress the latter around the pattern.

8. A molding apparatus having in combination, a reciprocable pattern plate, a hollow pattern projecting from said plate and operable upon movement of the same in one direction to project into a molding material, and means mounted for movement relative to the pattern plate including a member telescopically engaging said pattern and operable upon insertion of the pattern within the molding material to compress the molding material within the pattern.

9. A molding apparatus having in combination, a member for supporting a molding material, a supporting member having a hollow pattern projecting therefrom, means for reciprocating one of the members aforesaid to project the pattern into the molding material, and means mounted for movement relative to the pattern including an element operable by one of said members during the final portion of movement of the pattern into the material for compressing the molding material within the pattern.

10. A molding apparatus having in combination, a reciprocable pattern plate, a hollow pattern projecting from said plate and operable upon movement of the same in one direction to project into a molding material, and means mounted for movement relative to the pattern plate including a member operable upon insertion of the pattern within the molding material to compress the molding material within the pattern against the side walls of the latter and operable upon withdrawal of the pattern from the molding material to strip the same.

11. A molding apparatus having in combination, a reciprocable pattern plate, a plurality of tubular patterns having the upper end portions secured to said plate in spaced relation to each other and operable upon movement of the latter in one direction to project into a molding material, a plate arranged above the pattern plate in the path of travel of the latter, a plurality of members depending from the plate aforesaid telescopically engaging said patterns, and means connected to said plate and actuated by the pattern plate during the final portion of movement of the latter in the aforesaid direction for moving said members axially of said patterns to compress the molding material within the latter.

12. A molding apparatus having in combination, a member for supporting a molding material, a pattern plate having a hollow pattern projecting therefrom, a member telescopically engageable within the pattern, means for effecting relative movement of said pattern plate and member to project the pattern carried thereby into the molding material, and means subsequently operable to move said member into engagement with the molding material within the pattern for compressing the latter material.

13. A molding apparatus having in combination, a pattern plate having a hollow pattern projecting therefrom, a pair of members mounted for movement relative to the pattern plate slidably engaging the exterior and interior surfaces of the pattern, and means for actuating the pattern plate to project the pattern carried thereby into a molding material and subsequently operable to move said members in a corresponding direction to compress the molding material against the interior and exterior surfaces of the pattern.

14. A molding apparatus having in combination, a pattern plate having a pattern projecting therefrom, a member mounted for movement relative to the pattern and slidably engaging the exterior surface thereof, and means for actuating the pattern plate to project the pattern carried thereby into a molding material and subsequently operable to actuate said member in a corresponding direction to compress the molding material.

15. A molding apparatus having in combination, a pattern plate, a plurality of tubular patterns having the upper ends fixed to said plate in spaced relation to each other, a plate positioned above the pattern plate and mounted for movement relative thereto, a plurality of members depending from said plate and telescopically engaging within the tubular patterns, a second plate positioned below the pattern plate and apertured to slidably receive the lower end portions of said patterns, means for actuating said pattern plate to project the tubular patterns within a molding material and subsequently operable to move the plates aforesaid as a unit for compressing the molding material around the tubular patterns and within the same.

16. A molding apparatus having in combination, a member for supporting molding material, a hollow pattern, means for effecting relative movement of the pattern and member aforesaid and to project the pattern into the molding material, and means operable during relative movement of the pattern and member to compress the molding material within the hollow pattern against the inner surfaces of the latter.

17. A molding apparatus having in combination, a member for supporting molding material, a hollow pattern, means for effecting relative movement of said pattern and member aforesaid to project the pattern into the molding material, and two means operable in unison during relative movement of the pattern and member to compress the molding material around the pattern and within the latter.

18. A molding apparatus having in combination, a member for supporting molding material, a pattern, a supporting plate for the pattern, means for moving the plate to project the pattern into the molding material, a pressure plate in the path of the supporting plate, and means including a spacer between the pressure and supporting plates for varying the extent the pattern is projected into the material.

19. A molding apparatus having in combination, a flask for supporting a molding material, a pressure plate for the molding material larger in area than the flask and overlapping and engageable with the edges thereof, means for effecting relative movement of said flask and plate to compress the material, and means for preventing the escape of molding material during the compressing operation, including a continuous flange depending from said pressure plate and defining an area slightly less than the area defined by the flask.

20. A molding apparatus having in combination, a member for supporting molding material, vertically spaced plates movable in unison relative to the member, and actuating means for said plates including a pattern supporting plate therebetween and having a pattern projecting through one of said plates.

21. A molding apparatus having in combination, a member for supporting molding material, vertically spaced plates above said member, one being a stripper plate, a stud projecting from the other of said plates, and actuating means for said plates including a pattern supporting plate therebetween and having a pattern projecting through the stripper plate and receiving the stud.

22. A molding apparatus having in combination, a member for supporting the molding material, a pattern supporting member above the member aforesaid and having a hollow pattern adapted to be projected into the molding material, means for moving one of said members relative to the other to cause the pattern to be projected into said material, a plate below said pattern supporting member actuable thereby and having an opening receiving the pattern, a plate above the pattern supporting member and actuable thereby, and a stud projecting from the last mentioned plate and received within said pattern, the construction and arrangement being such that the first mentioned plate and stud are adapted to compress the material against the pattern when the movable member aforesaid is moved in one direction and are adapted to function as strippers when the said movable member is moved in another direction.

23. A molding apparatus having in combination, a member for supporting molding material, a pattern supporting member having a pattern projecting therefrom, means for moving one of said members relative to the other to project the pattern into the molding material, and a plate between said members and having an opening receiving the pattern, said plate being operable when the member aforesaid is moved in one direction to compress the molding material against the pattern and being operable to strip the pattern when the member aforesaid is moved in another direction.

24. A molding apparatus having in combination, a member for supporting molding material, a pattern supporting member having a pattern projecting therefrom, means for moving one of said members relative to the other to project the pattern into the molding material, and means actuable by said movable member after the pattern has been partially projected into the molding material to compress the said molding material around the pattern.

25. A molding apparatus having in combination, a member for supporting molding material, a pattern supporting member having a tubular pattern projecting therefrom, means for moving one of said members relative to the other to project the pattern into the molding material, and two means actuable by said movable member after the pattern has been partially projected into the molding material to compress the said molding material around the pattern, one of the two means being a pressure plate in the path of the pattern supporting member and engageable with the molding material outside the pattern, and the second of the two other means being a plunger engageable with molding material inside said pattern.

26. A molding apparatus having in combination, a member for supporting molding material, a pattern supporting member having a tubular pattern projecting therefrom, means for moving one of said members relative to the other to project the pattern into the molding material, and two means actuable in unison by the pattern supporting member to compress the molding material, one of the two means being engageable with the molding material outside the pattern, and the second of the two means being engageable with molding material inside the pattern.

In testimony whereof we affix our signatures.

WILLIAM H. BUNTING.
GEORGE F. YAGER.
OLIVER J. HEATH.